US011992054B2

(12) United States Patent
Liu

(10) Patent No.: US 11,992,054 B2
(45) Date of Patent: May 28, 2024

(54) ATOMIZER COMPRISING BOWL-SHAPED CERAMIC CORE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 412 days.

(21) Appl. No.: 17/351,284

(22) Filed: Jun. 18, 2021

(65) Prior Publication Data

US 2022/0175037 A1 Jun. 9, 2022

(30) Foreign Application Priority Data

Dec. 4, 2020 (CN) ........................ 202011419774.X
Dec. 4, 2020 (CN) ........................ 202022909553.2

(51) Int. Cl.

*A24F 40/46* (2020.01)
*A24F 40/10* (2020.01)
*A24F 40/48* (2020.01)
*A24F 40/60* (2020.01)
*H05B 3/16* (2006.01)

(52) U.S. Cl.

CPC .............. *A24F 40/46* (2020.01); *A24F 40/10* (2020.01); *A24F 40/48* (2020.01); *A24F 40/60* (2020.01); *H05B 3/16* (2013.01); *H05B 2203/021* (2013.01)

(58) Field of Classification Search

None
See application file for complete search history.

(56) References Cited

U.S. PATENT DOCUMENTS

| | | | | |
|---|---|---|---|---|
| 2017/0295845 A1* | 10/2017 | Bajpai | A61M 11/042 |
| 2018/0303166 A1* | 10/2018 | Qiu | A61M 15/06 |
| 2019/0373954 A1* | 12/2019 | Rado | A24F 40/40 |
| 2020/0281275 A1* | 9/2020 | Jordan | A24F 40/53 |
| 2020/0367574 A1* | 11/2020 | Choi | A24F 40/42 |
| 2020/0383383 A1* | 12/2020 | Fornarelli | F16K 1/46 |
| 2021/0368864 A1* | 12/2021 | Ding | A24F 40/40 |
| 2022/0192271 A1* | 6/2022 | Wen | A24F 40/40 |

FOREIGN PATENT DOCUMENTS

| | | | |
|---|---|---|---|
| CN | 105212270 A * | 1/2016 | A24F 40/485 |
| WO | WO-2018170849 A1 * | 9/2018 | |
| WO | WO-2020098544 A1 * | 5/2020 | A24F 40/10 |

OTHER PUBLICATIONS

WO 2020098544 A1 English Translation obtained from Espacenet, pp. 1-25, 2023 (Year: 2023).*
CN-105212270-A, English Translation obtained from Espacenet, pp. 1-10 (Year: 2016).*
WO-2018170849-A1 English Translation obtained from DAV, pp. 1-11 (Year: 2018).*

* cited by examiner

*Primary Examiner* — Philip Y Louie
*Assistant Examiner* — Madeleine P Delacruz
(74) *Attorney, Agent, or Firm* — MATTHIAS SCHOLL P.C.; Matthias Scholl

(57) ABSTRACT

An atomizer, including an e-liquid injection and vapor discharging module. The e-liquid injection and vapor discharging module includes an outer tube and an inner tube disposed in the outer tube. The inner tube is fixed in the outer tube through the protrusions. The inner tube is configured to accommodate e-liquid, and a cavity formed between the outer tube and the inner tube is configured to guide air and discharge vapor.

11 Claims, 4 Drawing Sheets

ATOMIZER COMPRISING BOWL-SHAPED CERAMIC CORE

CROSS-REFERENCE TO RELAYED APPLICATIONS

Pursuant to 35 U.S.C. § 119 and the Paris Convention Treaty, this application claims foreign priority to Chinese Patent Application No. 202011419774.X filed Dec. 4, 2020, and to Chinese Patent Application No. 202022909553.2 filed Dec. 4, 2020. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, MA 02142.

BACKGROUND

The disclosure relates to an atomizer comprising a bowl-shaped ceramic core.

Conventionally, the atomizer of an electronic cigarette includes a cylindrical ceramic core and a helical heating wire disposed in the cylindrical ceramic core. The heating wire has a small heating area and produces less vapor. In addition, the outer tube of the atomizer is glass which is fragile.

SUMMARY

The disclosure provides an atomizer, comprising an e-liquid injection and vapor discharging module; the e-liquid injection and vapor discharging module comprises an outer tube and an inner tube disposed in the outer tube; the inner tube is configured to accommodate e-liquid, and a cavity formed between the outer tube and the inner tube is configured to guide air and discharge vapor.

In a class of this embodiment, the outer tube comprises an inner wall, and two ends of the inner wall comprise protrusions; the inner tube is fixed in the outer tube through the protrusions.

In a class of this embodiment, the e-liquid injection and vapor discharging module further comprises a seal ring and a ceramic core; the seal ring comprises a hollow center and is disposed on an outer edge of the ceramic core; a bottom end of the inner tube is disposed on the seal ring around the ceramic core, or is disposed in the hollow center of the seal ring.

In a class of this embodiment, the ceramic core is in the shape of a concave bowl comprising the outer edge protruding upwards, and the ceramic core further comprises a heating wire disposed in the concave bowl.

In a class of this embodiment, the e-liquid injection and vapor discharging module further comprises a fixed ring and a base; the fixed ring is disposed on the base; and the fixed ring is disposed in a bottom opening of the outer tube.

In a class of this embodiment, the base comprises at least one air vent.

In a class of this embodiment, the e-liquid injection and vapor discharging module further comprises a silica fixing part; the ceramic core is fixed on the silica fixing part, and the silica fixing part is disposed in the base.

In a class of this embodiment, the upper part of the silica fixing part comprises at least one gap.

In a class of this embodiment, the e-liquid injection and vapor discharging module further comprises a lamp panel disposed on a bottom end of the silica fixing part and configured to light up when the atomizer is powered on, and emit a variety of luster transmittable from the outer tube.

In a class of this embodiment, the e-liquid injection and vapor discharging module further comprises a plug disposed on a top end of the inner tube and configured to seal a top opening of the inner tube.

In a class of this embodiment, the e-liquid injection and vapor discharging module further comprises a joint and an insulation ring; the insulation ring is disposed in a bottom of the base for isolating positive and negative leads of the ceramic core and the lamp panel and fixing the negative lead; the joint is disposed in the insulation ring for fixing the positive leads of the ceramic core and the lamp panel.

In a class of this embodiment, the inner tube comprises glass, crystal, quartz, ceramic, jade, mica, or agate, or glass, crystal, quartz, ceramic, jade, mica, or agate coated with an explosion-proof membrane; and the outer tube comprises plastic, high temperature resistant PCTG, high temperature resistant resin, or high temperature resistant acrylic, or plastic, high temperature resistant PCTG, high temperature resistant resin, or high temperature resistant acrylic coated with an explosion-proof membrane.

In a class of this embodiment, the inner tube is made of glass, the outer tube is made of plastics.

DETAILED DESCRIPTION

To further illustrate, embodiments detailing an atomizer are described below. It should be noted that the following embodiments are intended to describe and not to limit the disclosure.

Figure 1:
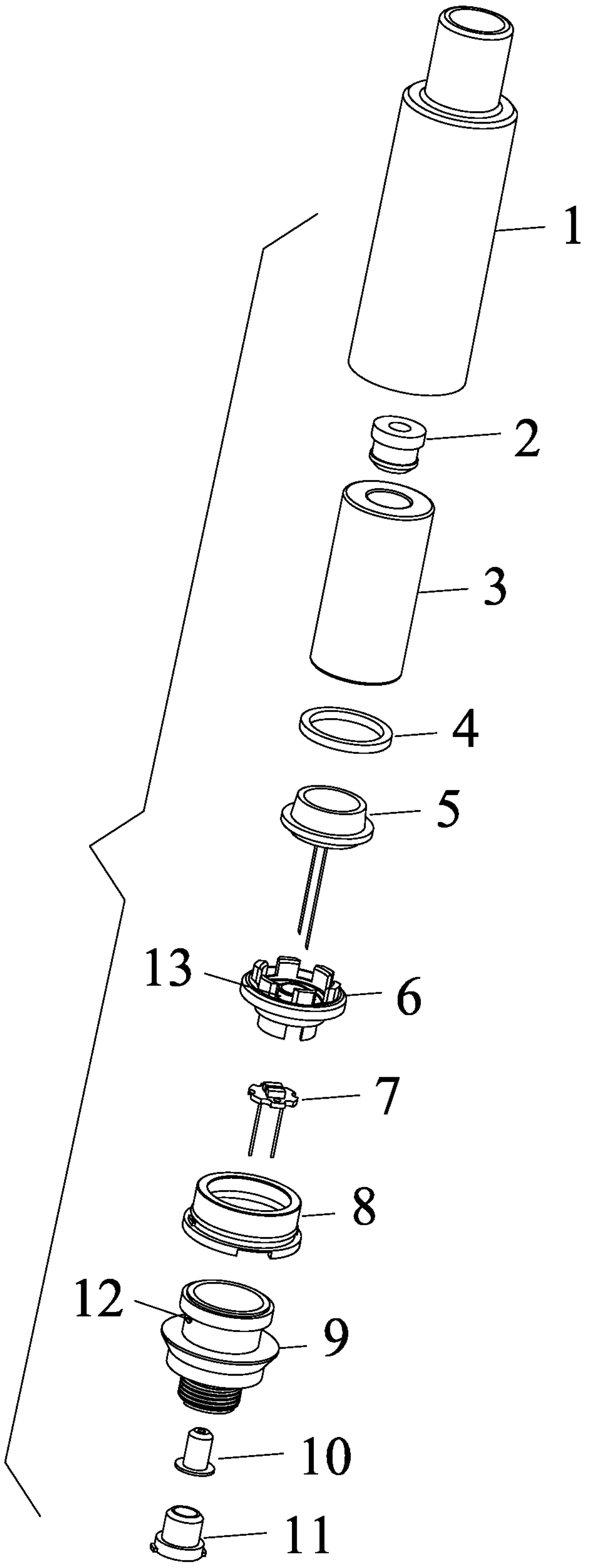
FIG. 1 is an exploded view of an atomizer according to one embodiment of the disclosure.
Figure 2:
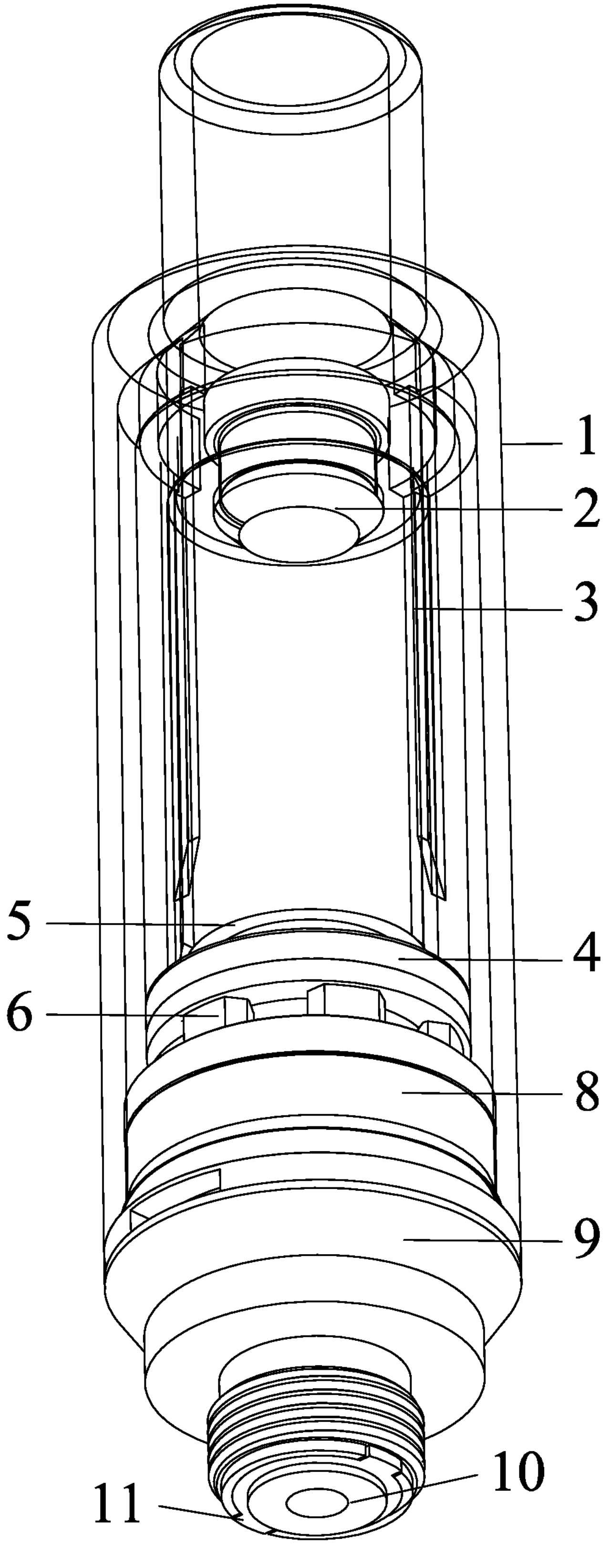
FIG. 2 is a schematic diagram of an atomizer according to one embodiment of the disclosure.
Figure 3:
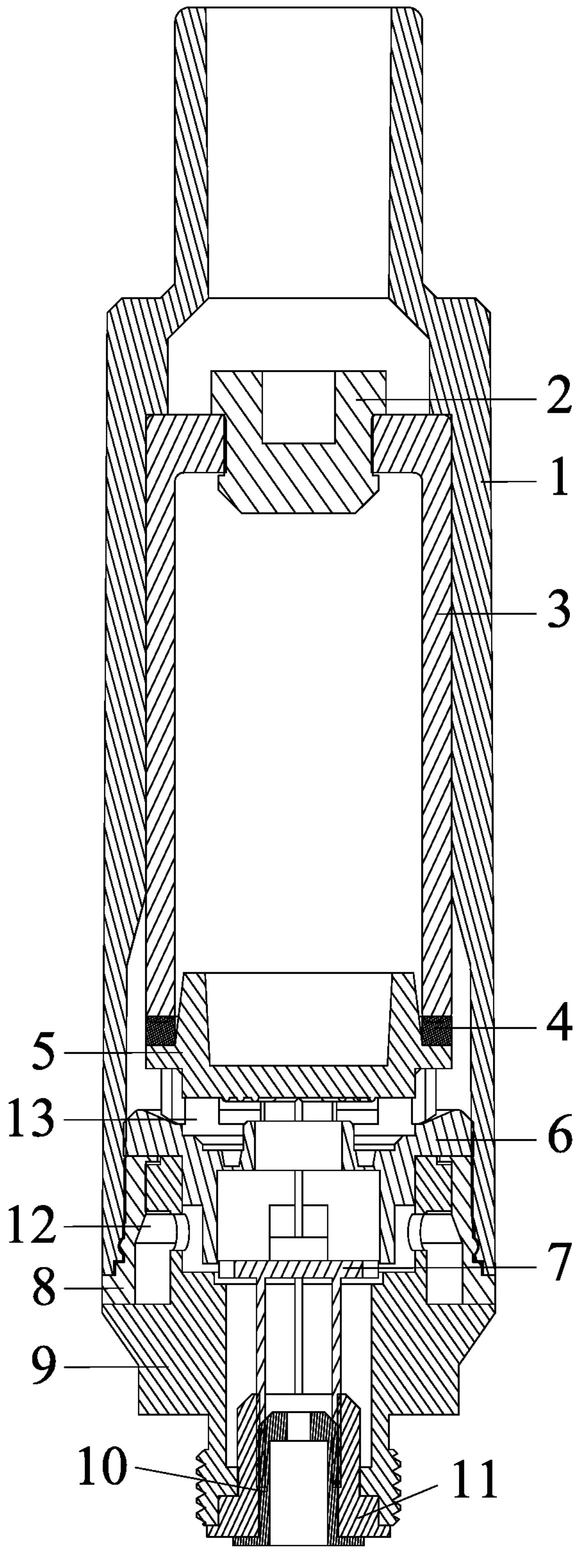
FIG. 3 is a sectional view of an atomizer according to one embodiment of the disclosure.
Figure 4:
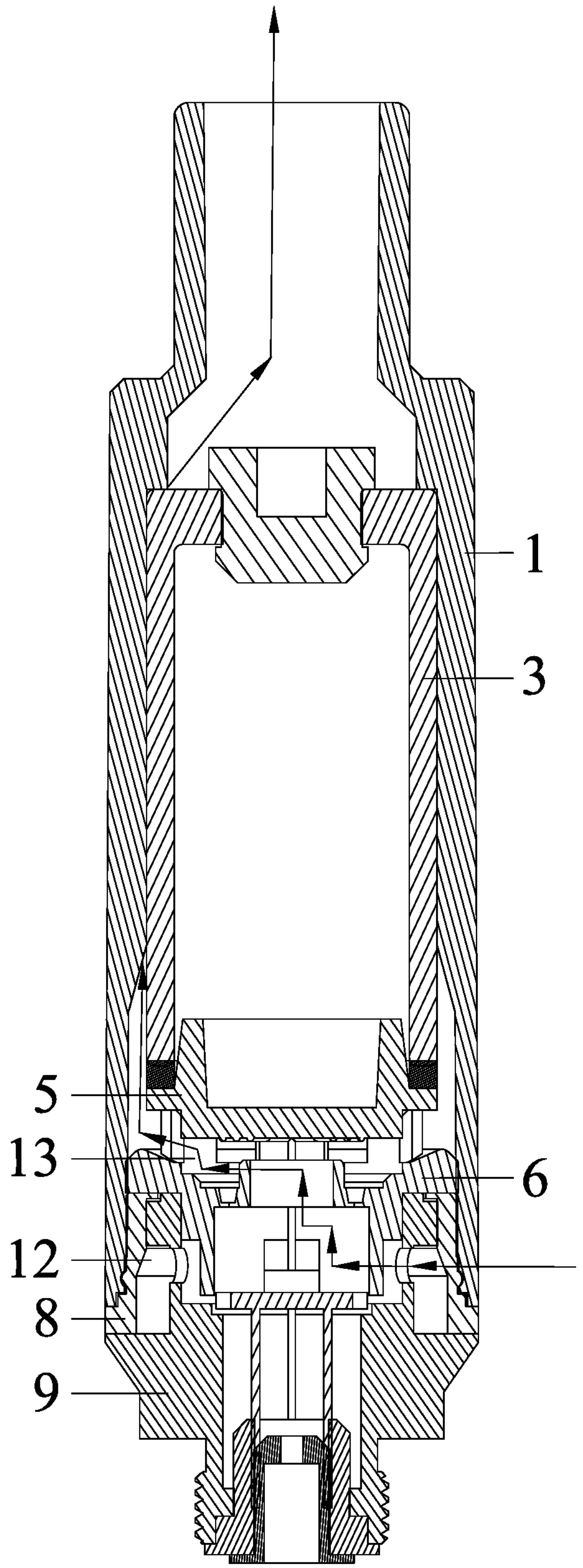
FIG. 4 shows an airflow direction of an atomizer according to one embodiment of the disclosure.

As shown in FIGS. 1-3, the disclosure provides an atomizer comprising an e-liquid injection and vapor discharging module; the e-liquid injection and vapor discharging module comprises an outer tube 1, a plug 2, an inner tube 3, a seal ring 4, a ceramic core 5, a silica fixing part 6, a lamp panel 7, a fixed ring 8, a base 9, a joint 10, and an insulation ring 11. The inner tube 3 disposed in the outer tube 1. The base comprises at least one air vent 12, and the upper part of the silica fixing part 6 comprises at least one gap 13. The outer tube 1 comprises an inner wall, and two ends of the inner wall comprise protrusions; the inner tube 3 is fixed in the outer tube 1 through the protrusions; the inner tube 3 is configured to accommodate e-liquid, and a cavity formed between the outer tube 1 and the inner tube 3 is configured to guide air and discharge vapor. The seal ring 4 comprises a hollow center and is disposed on the outer edge of the ceramic core 5 to seal the bottom opening of the inner tube 3; the bottom end of the inner tube 3 is disposed on the seal ring 4 around the ceramic core 5, or is disposed in the hollow center of the seal ring 4. The fixed ring 8 is disposed on the base 9; and the fixed ring 8 is disposed in the bottom opening of the outer tube 1. The ceramic core 5 is fixed on the silica fixing part 6 to atomize the e-liquid in the inner tube 3. The lamp panel 7 disposed on the bottom end of the silica fixing part 6 and is configured to light up when the atomizer is powered on, and emit a variety of luster transmittable from the outer tube 1. The silica fixing part 6 is disposed in the base 9. The insulation ring 11 is disposed in a bottom of the base 9 for isolating positive and negative leads of the ceramic core 5 and the lamp panel 7 and fixing the negative lead; the joint 10 is disposed in the insulation ring 11 for fixing the positive leads of the ceramic core 5 and the lamp panel 7. The plug 2 is disposed on the top end of the inner tube 3 and configured to seal the top opening of the inner tube.

After the e-liquid is injected into the inner tube 3, it will penetrate into the surface of the ceramic core 5, but no droplet is formed on the surface of the ceramic core 5 (in conventional atomizers, the droplet is formed and leaks into the space between the inner tube 3 and the outer tube 1). When in use, the air flows from the gap of the fixed ring 8 into the space between the fixed ring 8 and the base 9, enters the air vent 12 of the base 9, flows through the gap 13 on the upper part of the silica fixing part 6, and drives the vapor produced by the ceramic core 5 to pass through the cavity between the outer tube 1 and the inner tube 3 and flow out of the top opening of the outer tube 1 for inhalation by a user.

In certain embodiment, the gap 13 and the air vent 12 are designed for air circulation, which can be changed in different ways, for example, the gap 13 can be replaced by a through hole. The inner tube 3 comprises glass, crystal, quartz, ceramic, jade, mica, or agate, or glass, crystal, quartz, ceramic, jade, mica, or agate coated with an explosion-proof membrane; and the outer tube 1 comprises plastic, high temperature resistant PCTG, high temperature resistant resin, or high temperature resistant acrylic, or plastic, high temperature resistant PCTG, high temperature resistant resin, or high temperature resistant acrylic coated with an explosion-proof membrane.

In a class of this embodiment, the inner tube is made of glass, the outer tube is made of plastics.

The following advantages are associated with the atomizer of the disclosure:

1. The cavity formed between the outer tube and the inner tube of the atomizer is used to guide air and discharge vapor, so that the e-liquid injection and vapor discharging module of the atomizer is cost-effective.

2. The ceramic core is in the shape of a concave bowl comprising the outer edge protruding upwards, and the heating wire is disposed in the concave bowl. The design is novel, increasing the heating area of the atomizer.

3. The e-liquid can be directly filled into the inner tube, which is easy to operate.

4. The air vent of the base is shaded by the fixed ring disposed on the base. The air flows from the gap of the fixed ring into the space between the fixed ring and the base, and then enters the air vent of the base. The structure is novel.

5. The outer tube of atomizer is plastic, which is inexpensive and not easy to break.

6. The e-liquid injection and vapor discharging module comprises a lamp panel disposed on the bottom end of the silica fixing part and configured to light up when the atomizer is powered on, and emit a variety of luster transmittable from the outer tube, which help the user know whether the atomizer is in a power-up state.

It will be obvious to those skilled in the art that changes and modifications may be made, and therefore, the aim in the appended claims is to cover all such changes and modifications.

What is claimed is:

1. An atomizer, comprising an e-liquid injection and vapor discharging module, wherein the e-liquid injection and vapor discharging module comprises an outer tube, an inner tube disposed in the outer; tube, a seal ring, and a ceramic core; the seal ring comprises a hollow center; the ceramic core comprises a bottom wall having a bottom surface, a side wall extending upwards from the bottom wall, and a flange extending out from the side wall; wherein:

the inner tube is configured to accommodate e liquid; the ceramic core is configured to atomize the e-liquid in the inner tube to produce a vapor; and a cavity formed between the outer tube and the inner tube is configured to guide air and discharge the vapor;

the seal ring is disposed on the flange of the ceramic core and around the side wall of the ceramic core;

a bottom end of the inner tube is disposed on the flange of the ceramic core, and the seal ring is disposed between the bottom end of the inner tube and the flange of the ceramic core; whereby the inner tube is supported and sealed by the ceramic core;

the ceramic core is in the shape of a concave bowl;

the ceramic core further comprises a heating wire disposed on the bottom surface of the bottom wall, wherein the bottom surface is a substantially flat surface; and the ceramic core is configured to discharge the vapor out from the bottom surface into the cavity formed between the outer tube and the inner tube.

2. The atomizer of claim 1, wherein the outer tube comprises an inner wall, the inner tube is fixed in the outer tube.

3. The atomizer of claim 1, wherein the e-liquid injection and vapor discharging module further comprises a fixed ring and a base; the fixed ring is disposed on the base; and the fixed ring is disposed in a bottom opening of the outer tube.

4. The atomizer of claim 3, wherein the base comprises at least one air vent.

5. The atomizer of claim 4, wherein the e-liquid injection and vapor discharging module further comprises a silica fixing part; the ceramic core is fixed on the silica fixing part, and the silica fixing part is disposed in the base.

6. The atomizer of claim 5, wherein an upper part of the silica fixing part comprises at least one gap.

7. The atomizer of claim 6, wherein the e-liquid injection and vapor discharging module further comprises a lamp panel disposed on a bottom end of the silica fixing part and configured to light up when the atomizer is powered on, and emit a variety of luster transmittable from the outer tube.

8. The atomizer of claim 1, wherein the e-liquid injection and vapor discharging module further comprises a plug disposed on a top end of the inner tube and configured to seal a top opening of the inner tube.

9. The atomizer of claim 7, wherein the e-liquid injection and vapor discharging module further comprises a joint and an insulation ring; the insulation ring is disposed in a bottom of the base for isolating positive and negative leads of the ceramic core and the lamp panel and fixing the negative lead; the joint is disposed in the insulation ring for fixing the positive leads of the ceramic core and the lamp panel.

10. The atomizer of claim 1, wherein the inner tube comprises glass, crystal, quartz, ceramic, jade, mica, or agate, or glass, crystal, quartz, ceramic, jade, mica, or agate coated with an explosion-proof membrane; and the outer tube comprises plastic, high temperature resistant PCTG, high temperature resistant resin, or high temperature resistant acrylic, or plastic, high temperature resistant PCTG, high temperature resistant resin, or high temperature resistant acrylic coated with an explosion-proof membrane.

11. The atomizer of claim 10, wherein the inner tube is made of glass, the outer tube is made of plastics.

* * * * *